United States Patent [19]
Asayama

[11] Patent Number: 5,386,285
[45] Date of Patent: Jan. 31, 1995

[54] OBSTACLE DETECTING DEVICE FOR A VEHICLE

[75] Inventor: Yoshiaki Asayama, Himeji, Japan

[73] Assignee: Mitsubishi Denki Kabushiki Kaisha, Tokyo, Japan

[21] Appl. No.: 13,092

[22] Filed: Feb. 3, 1993

[30] Foreign Application Priority Data

Feb. 28, 1992 [JP] Japan ................... 4-043065

[51] Int. Cl.$^6$ ................. G01C 3/00; G01C 3/08; B60T 7/16
[52] U.S. Cl. ........................ 356/1; 180/169; 340/435; 340/904; 348/139; 356/5
[58] Field of Search .............. 180/169; 358/107; 356/1, 4, 5; 342/53, 54, 55; 340/904, 435; 348/139

[56] References Cited

U.S. PATENT DOCUMENTS

| | | | |
|---|---|---|---|
| 4,805,015 | 2/1989 | Copeland | 358/109 |
| 4,931,937 | 6/1990 | Kakinami et al. | |
| 5,023,712 | 6/1991 | Kajiwara | |
| 5,161,632 | 11/1992 | Asayama | 180/167 |
| 5,166,789 | 11/1992 | Myrick | 358/109 |
| 5,168,355 | 12/1992 | Asayama | |
| 5,177,462 | 1/1993 | Kajiwara | |
| 5,249,157 | 9/1993 | Taylor | 340/903 |

FOREIGN PATENT DOCUMENTS 1275237 2/1989 Japan .
3118610 5/1991 Japan .

OTHER PUBLICATIONS

Machine Design, vol. 63, No. 1, Jan. 10, 1991, pp. 101–103.

Primary Examiner—Stephen C. Buczinski
Attorney, Agent, or Firm—Sughrue, Mion, Zinn, Macpeak & Seas

[57] ABSTRACT

An obstacle detecting device for a vehicle comprises a pair of image sensors for taking an image of an object surrounding a vehicle, a display image plane for displaying an image data taken by said pair of image sensors as an image, and a plurality of windows designating regions of said image on said display image plane. The device further comprises an optical obstacle detecting device for detecting distances from said vehicle to said object in said regions of the image designated by said plurality of windows for the respective windows to thereby detect an obstacle, a laser radar device mounted on the vehicle for radiating a radar beam to the object surrounding the vehicle to thereby detect said obstacle, and an obstacle selecting device for selecting either the obstacle detected by said optical obstacle detecting device or the obstacle detected by said laser radar device mounted on the vehicle.

8 Claims, 5 Drawing Sheets

IMAGE IN MEMORY 9

IMAGE IN MEMORY 8

OBSTACLE DETECTING DEVICE FOR A VEHICLE

BACKGROUND OF THE INVENTION

Field of the Invention

The present invention relates to an obstacle detecting device for a vehicle for detecting obstacles in front of a driving vehicle, other vehicles approaching from behind the driving vehicle, or the like.

DESCRIPTION OF THE RELATED ART

Conventionally, as a device for detecting obstacles in front of or behind a driving vehicle, as is suggested by Japanese Examined Patent Publication No. 15337/1980, Japanese Examined Utility Model Publication No. 43172/1988 or the like, there is a radar device mounted on a vehicle having a construction to detect the presence or the absence of the obstacles, or to detect a distance from the driving vehicle to an obstacle by radiating a radio wave, a laser beam or the like towards a monitoring direction in front of or behind the driving vehicle and by detecting a wave reflected from the obstacle.

On the other hand, conventionally, optical distance detecting devices employing image sensors are disclosed in Japanese Examined Patent Publication No. 38085/1988, Japanese Examined Patent Publication No. 46363/1988 and the like. As shown in FIG. 7, these devices are provided with dual optical systems arranged on the left and on the right hand side thereof. These left and right optical systems are disposed apart from each other by a base line length L, and provided with lenses 1 and 2. Respective image sensors 3 and 4 are provided at positions apart from the lenses 1 and 2 by the focal length of f. In a signal treating device 30, an image signal of one of the image sensors 3 and 4 is successively shifted and finally, electrically superposed on the other image. From a shift quantity l when the both image signals agree the most, a distance R from a driving vehicle to an object 31 is obtained by an equation R=f·L/l employing the principle of trigonometry.

Since the conventional obstacle detecting device is constructed as above, an obstacle in the direction of radiating a radio wave or a laser beam, can be detected. However, it is difficult to detect whether the obstacle hampers the running of the driving vehicle. For instance, there is a problem wherein the device detects a guardrail in front of the driving vehicle as an obstacle in case of running on a curved road. Furthermore, a number of transmitting and receiving devices should be provided to detect in which direction an obstacle is in a wide scope of vision. On the other hand, in case of an optical distance detecting device employing image sensors, it becomes difficult to take an image of an object in the dusk or in the dark, and, therefore, the distance measurement becomes a problem.

SUMMARY OF THE INVENTION

It is an object of the present invention to solve the above problems of a radar device mounted on a vehicle and to provide an obstacle detecting device for a vehicle capable of easily finding out in which direction of a wide scope of vision an obstacle is, discerning whether the obstacle hampers the running of a driving vehicle, and which is provided with a high reliability of an obstacle detecting function.

According an aspect of the present invention, there is provided an obstacle detecting device for a vehicle comprising:
- a pair of image sensors for taking an image of an object surrounding a vehicle;
- a display image plane for displaying an image data taken by said pair of image sensors as an image;
- a plurality of windows designating regions of said image on said display image plane;
- an optical obstacle detecting means for detecting distances from said vehicle to said object in said regions of the image designated by said plurality of windows for the respective windows to thereby detect an obstacle;
- a laser radar device mounted on the vehicle for radiating a radar beam to the object surrounding the vehicle to thereby detect said obstacle; and
- an obstacle selecting means for selecting either one of the obstacle detected by said optical obstacle detecting means and the obstacle detected by said laser radar device mounted on the vehicle.

According to the invented device, a plurality of windows are set in the display image plane, at positions wherein the presence or the absence of the obstacle needs to be monitored. The corresponding images on the top and on the bottom taken by the pair of image sensors, are compared, while setting the respective images in the windows as reference images. The shift amount between the both images is electrically detected. The distances from the driving vehicle to the object detected by the respective windows are measured by the principle of trigonometry. A determination is made whether the object detected by the laser radar device mounted on the vehicle, hampers the running of the driving vehicle, based on the values of the distance measurement and the window setting positions.

DETAILED DESCRIPTION OF THE PREFERRED EMBODIMENTS

Now, the present invention will be described in further detail with reference to Examples. However, it should be understood that the present invention is by no means restricted to such specific Examples.

EXAMPLE 1

Figure 1:
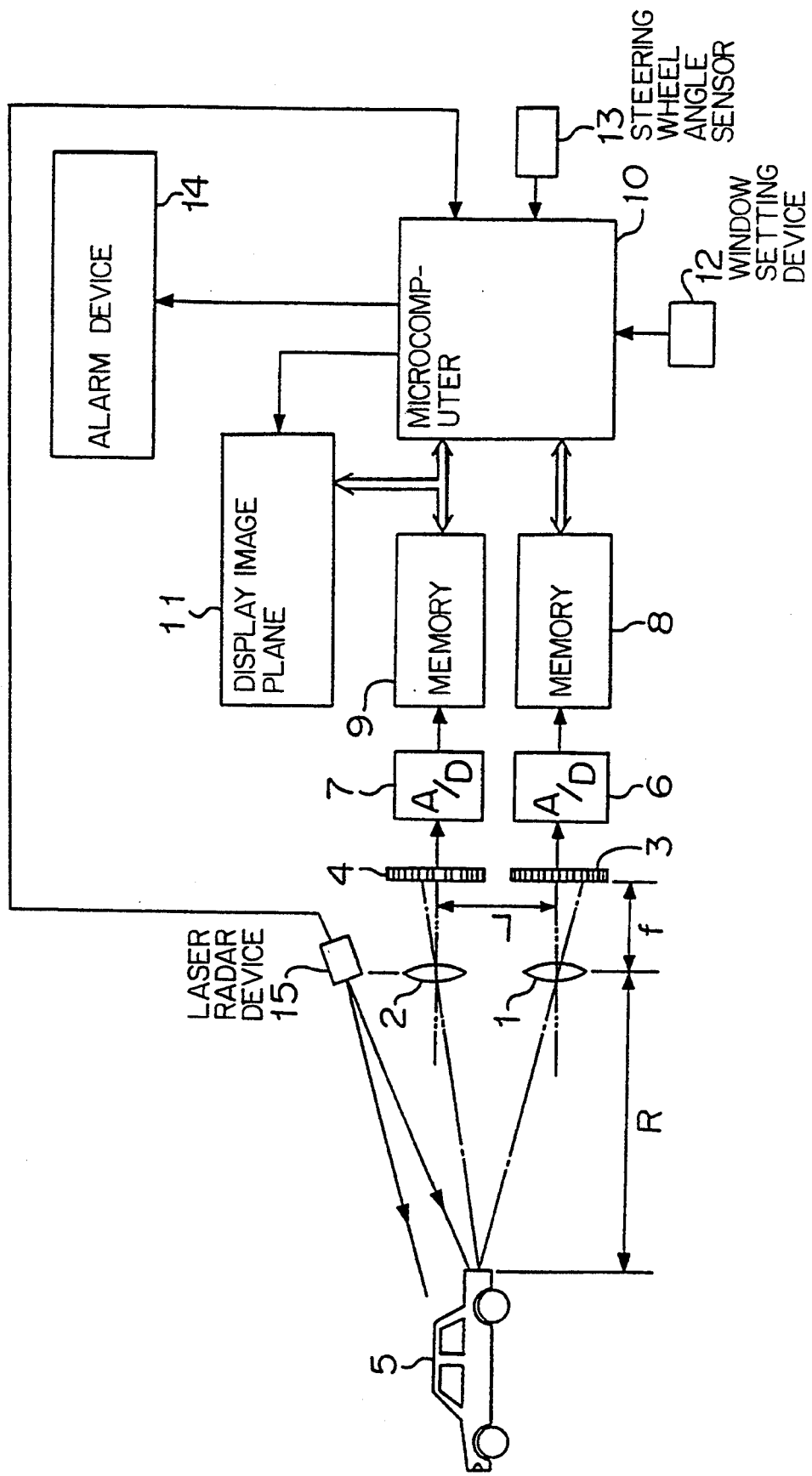
FIG. 1 is a construction diagram showing an embodiment of an obstacle detecting device for a vehicle according to the present invention.

An explanation will be given of an embodiment of this invention referring to the drawings, as follows. FIG. 1 shows an example wherein an inter-vehicle distance from a driving vehicle to a preceding vehicle running in front of the driving vehicle, by mounting an obstacle detecting device for a vehicle of this invention on the driving vehicle. In FIG. 1, reference numerals 1 and 2 designate lenses composing a top and a bottom optical systems, 3 and 4 represents two dimensional image sensors correspondingly provided with respect to the lenses 1 and 2, and 5 represents the preceding vehicle running in front of the driving vehicle.

Figure 2:
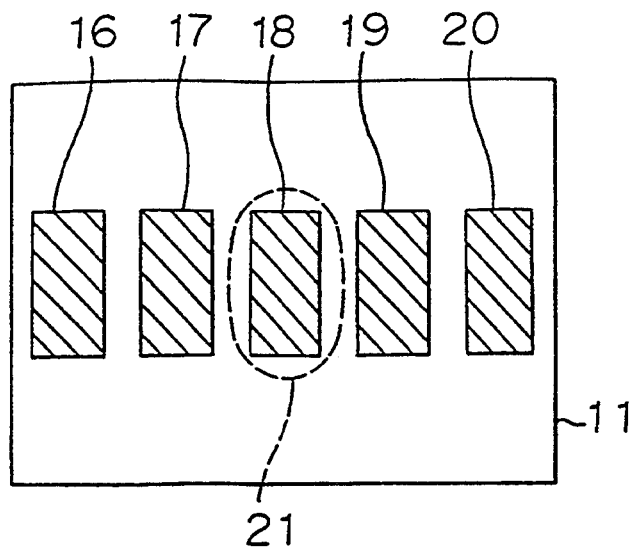
FIG. 2 shows an arrangement of a plurality of windows set in a display image plane.

Numerals 6 and 7 designate analogue-to-digital converters, 8 and 9, memories, 10, a microcomputer and 11, a display image plane for displaying an image taken by the top image sensor 4, which is controlled by the microcomputer 10. A numeral 12 designates a device for setting windows for designating regions for monitoring the presence or the absence of the obstacle on the image. As shown in FIG. 2, a plurality of windows 16, 17, 18, 19 and 20 set by this device, are previously arranged at predetermined positions on the display image plane 11. A numeral 13 designates a steering wheel angle sensor for detecting an operating amount of a steering wheel of the driving vehicle, and 14, an alarm device composed, for instance, of a buzzer. A numeral 15 designates a laser radar device mounted on a vehicle for detecting an obstacle. As shown in FIG. 2, a search region 21 of an obstacle by the laser radar device 15 is disposed at a position approximately equal to a monitoring region of the window 18 at the central portion of the display image plane 1.

Figure 3:
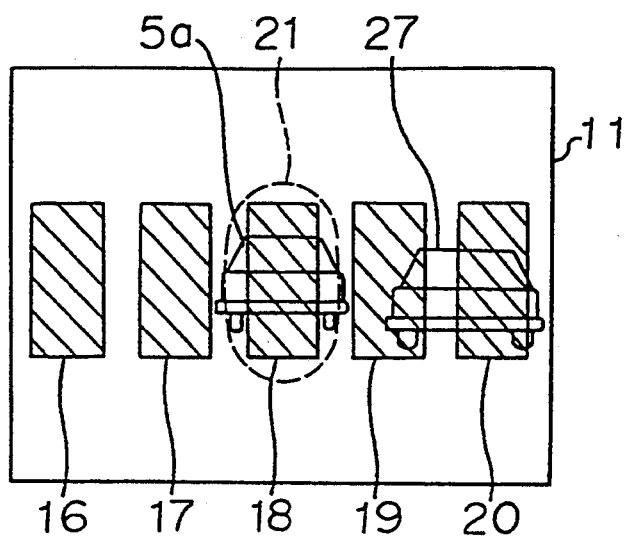
FIG. 3 shows a state wherein an image of a preceding vehicle enters a display image plane.
Figure 4:
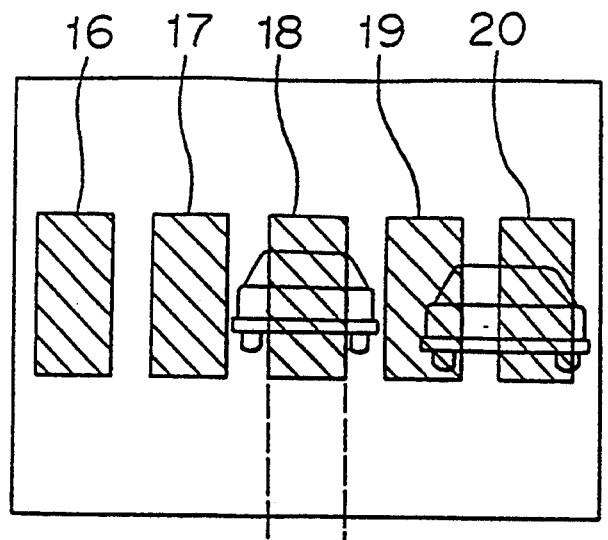
FIG. 4 shows regions of images which are compared with reference images in respective windows.
Figure 4:
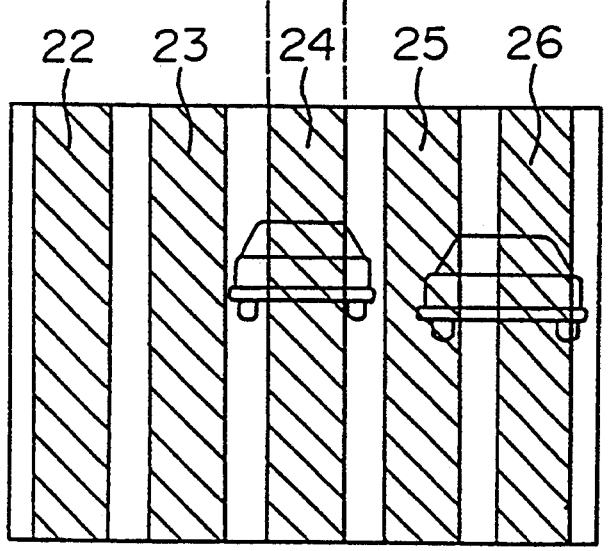

In the above construction when an image 5a of a preceding vehicle is displayed as an obstacle in the image in front of the driving car, taken, for instance, by the top image sensor 4, as shown in FIG. 3, the microcomputer 10 reads pixel signals in the window 18 by reading the preceding vehicle image 5a from the memory 9 and determines uses the pixel signals as a reference image signal for calculating the inter-vehicle distance. The microcomputer 10 then selects a region corresponding to the window 18 in the memory 8 wherein the image signal of the bottom image sensor 3 is memorized, and by successively shifting the image signal of the memory 8 corresponding to the reference image signal, pixel by pixel, calculates a summation of absolute values of the differences of the both signals at every top and bottom pixel. That is to say, the position of the image which fits the image in the window 18 the most, is obtained by successively shifting the image pixel by pixel. As shown in FIG. 4, the region related to the calculation is a region 24 corresponding to the position of the window 18 wherein the image in the memory 8 corresponds to the reference image signal in the window 18. Suppose that a shift amount of pixels which minimizes the summation of the absolute values of the differences of signals, by comparing the top and the bottom pixels as above, is n pixels, a pitch of pixel is P, a base line length of the optical system is L, the focal length of the lenses 1 and 2 is f and the distance from the driving vehicle to the preceding vehicle 5 is R. Then, R can be calculated by the following equation.

$$R = f \cdot L / n \cdot P \quad (1)$$

In this way, the distance from the driving car to the object in the window 18 can be detected.

Similarly, when another preceding vehicle running on a contiguous lane enters the scope of vision of the image sensors 3 and 4, and as shown in FIG. 3, a preceding vehicle image 27 thereof is caught by the window 20. The microcomputer 10 uses the image signal in the window 20 as the reference image signal, selects a region 26 of the image in the memory 8 corresponding to the window 20 of the image in the memory 9, as shown in FIG. 4, and obtains a position of the image in the region 26, which fits the image in the window 20 the most. Furthermore, the microcomputer 10 calculates the inter-vehicle distance from the driving vehicle to the other preceding vehicle, by the above equation (1). In this way, even in case wherein a plurality of preceding cars are running, the inter-vehicle distances from the driving vehicle to the respective preceding vehicles, can simultaneously be determined.

As stated above, as shown in FIG. 4, the object caught by the windows 16, 17, 18, 19 and 20 set in the display image plane 11, is compared of the images thereof in the regions for calculation 22, 23, 24, 25 and 26, and the distances from the driving vehicle to the object can be detected with respect to the windows 16, 17, 18, 19 and 20. Furthermore, when the driving vehicle is detected to be running straight as indicated by an output signal of the steering wheel angle sensor 13, since it is determined that the preceding vehicle caught by the window 18 at the central portion of the display image plane 11, is a preceding vehicle running on the same lane, when the inter-vehicle distance from the driving vehicle to the preceding vehicle becomes short, the microcomputer 10 operates the alarm device 14 and informs the driver that there is an obstacle in front of the driving vehicle. Furthermore, when the driving vehicle is running straight on, since the preceding vehicle running in front of the driving vehicle enters the search region 21 of the laser radar device 15 mounted on the vehicle, the laser radar device 15 mounted on the vehicle also detects the inter-vehicle distance from the driving vehicle to the preceding vehicle. The detected distance signal is input into the microcomputer 10, and similar to the above, when the inter-vehicle distance becomes short, the microcomputer 10 operates the alarm device 14 and informs the driver that there is an obstacle in front of the driving vehicle.

Especially, when the driving vehicle is running in the dusk or in a tunnel, an obstacle selecting means chooses to detect a vehicle by either the optical obstacle detecting means or the laser radar device 15, to determine whether the obstacle hampers the running of the driving vehicle. When the driving vehicle is running in the dusk or in a tunnel, the contrast in the image plane by the image sensors 3 and 4 is deteriorated, and the image of the preceding vehicle 5a becomes dim. As a result, the inter-vehicle distance detection by the image comparison becomes unstable and a variation of the detected value of distance becomes considerable.

When the variation is greater than a predetermined value, a determination is made wherein the inter-vehicle distance detection becomes unstable and the obstacle detected by the laser radar device mounted on a vehicle is determined to be an obstacle hampering the running of the driving vehicle.

Accordingly, in case wherein it is difficult for the optical obstacle detecting means to detect an object, the detection is performed by the laser radar device mounted on a vehicle.

Figure 5:
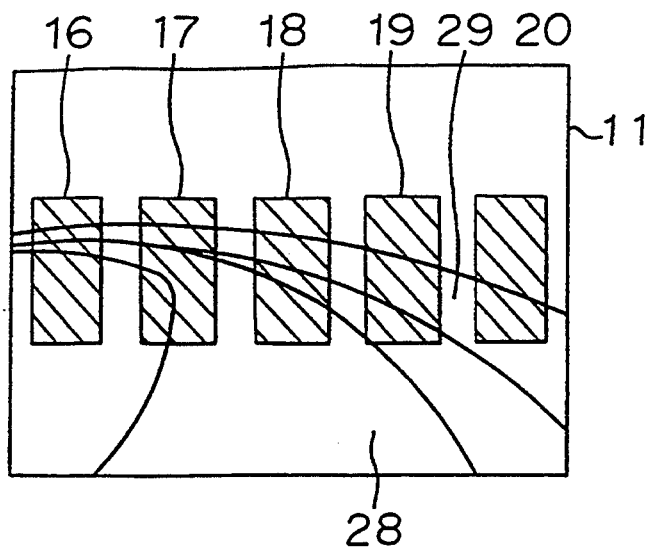
FIG. 5 shows an example of an image when a driving vehicle is running on a curved road.

On the other hand, when the driving vehicle is running on a curved road, for instance, a road curved on the left, as shown in FIG. 5, an image 29 of a guardrail provided at the shoulder of a running lane 28, is displayed as an image in front of the driving vehicle. Similar to the above, the distances from the driving vehicle to the guardrail are detected by the respective windows 16, 17, 18, 19 and 20 displaying the image 29 of the guardrail.

Compared with the distance detected by the window 18 at the central portion of the display image plane 11, in cases of the windows 19 and 20 situated on the right hand side of the display image plane 11, the detected distances become shorter in the order of the window 19 and the window 20, whereas in case of the windows 17 and 16 situated on the left hand side of the display image plane 11, the detected distances become longer in the order of the window 17 and the window 16, which is a characteristic of the detected signal. Accordingly, when the steering wheel is detected to be turning to the left by the steering wheel angle sensor 13 and the distance detecting information having the above characteristic is provided, the microcomputer 10 determines that the object caught by the central window 18 (also is the object caught by the laser radar device 15 mounted on the vehicle) is a guardrail, and does not operate the alarm device 14, since the obstacle does not hamper the running of the driving vehicle although the detected distance is short. In this way, based on the distance detecting information detected by the respective windows 16, 17, 18, 19 and 20, the recognition of the obstacle in front of the driving vehicle, is performed.

Furthermore, when the detected distance of the window 17 is smaller than that of the window 18 in the curved road, the microcomputer 10 determines that there is a preceding vehicle or another obstacle at the position of the window 17, and operates the alarm device 14. In this way, it is possible for the microcomputer 10 to catch the obstacle by the respective windows 16, 17, 18, 19 and 20 in case wherein there is an obstacle at places which are not caught by the laser radar device 15 mounted on the vehicle. Therefore, it is possible for the microcomputer 10 to determine whether the obstacle hampers the running of the driving vehicle, by the position of the window which catches the obstacle, and the running direction of the driving vehicle detected by the output signal of the steering wheel angle sensor 13.

Figure 6:
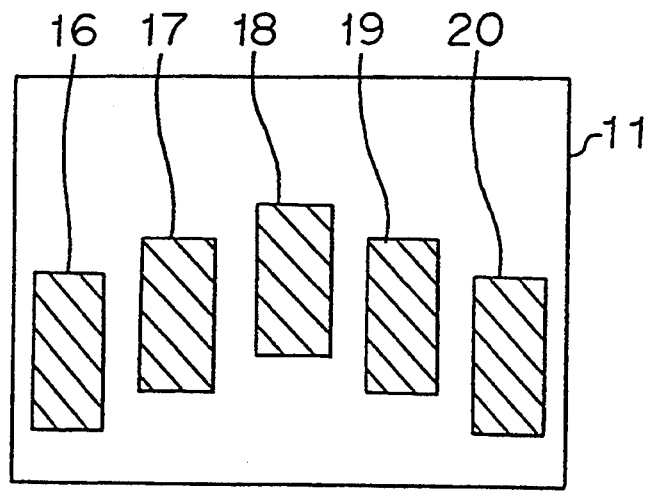
FIG. 6 shows another example of an arrangement of windows set in a display image plane.
Figure 7:
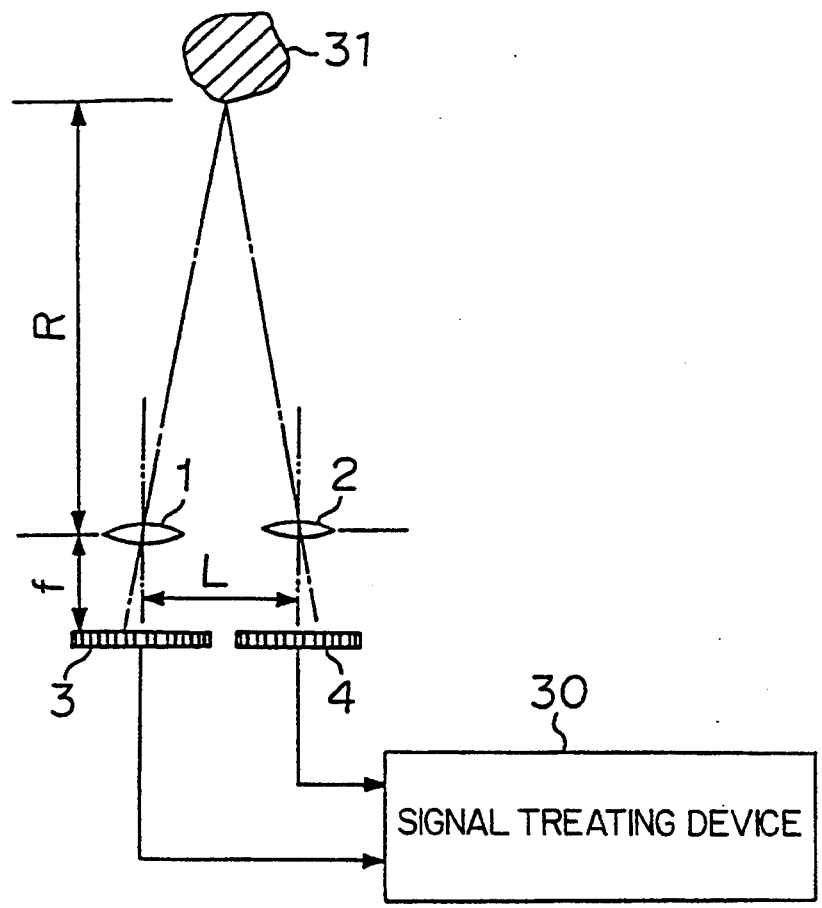
FIG. 7 shows a construction device of a conventional optical distance detecting device.

Furthermore, in the above example, the five windows 16, 17, 18, 19 and 20 are set. However, the number of window can arbitrarily set by the size of an obstacle in the scope of vision of the image sensor, the number of obstacles which require the distance measurement, or the like. The size and the shape of window can arbitrarily be changed respectively in accordance with the object. As shown in FIG. 6, the set position of window can be arranged wherein the positions of the respective windows are shifted in accordance with the region to be monitored.

Furthermore, a scope of vision behind the driving car can be monitored by the invented device. The invented device can find out that the object is approaching or departing by a ratio of change of the distance from the driving vehicle to the object caught by the windows. Furthermore, although one window 18 is set for the search region 21 of the laser radar device mounted on the vehicle, two or three windows may be set in accordance with the size of the search region 21 and the number of window is not restricted to the above example.

As stated above, in this invention, a plurality of windows are set at the predetermined positions of the display image plane wherein the image surrounding the vehicle taken by the image sensor, is displayed. The device is provided with the means of detecting the distances from the driving vehicle to the object caught by these windows for the respective windows, and the laser radar device mounted on a vehicle for detecting the obstacle having the search region within a predetermined angle range surrounding the driving vehicle. Therefore, it is possible for the device to easily find out what the obstacle is which is caught by the laser radar device and to recognize whether the obstacle hampers the running of the driving vehicle.

I claim:

1. An obstacle detecting device for a vehicle comprising:
   first and second image sensors for sensing an environment, including an object, external to said vehicle and outputting first and second image data, respectively, representative thereof;
   a display image plane for displaying said first image data as a display image including an image of said object;
   means for designating a plurality of regions of said display image on said display image plane;
   optical detecting means for detecting distances from said vehicle to said object when said image of said object is in at least one of said regions of said display image;
   a device mounted on said vehicle for radiating a beam to said object and receiving a reflected beam therefrom to detect distances from said vehicle to said object; and
   microprocessor means for causing, based on a predetermined condition, either said optical detecting means or said device to detect the distances from said vehicle to said object.

2. An obstacle detecting device as claimed in claim 1, further comprising:
   means for determining a position of a steering wheel of said vehicle and outputting steering signals representative thereof; and
   means for determining, in accordance with the steering signals and the detected distances of said vehicle to said object, a position of said object with respect to a direction of movement of said vehicle.

3. An obstacle detecting device as claimed in claim 2, further comprising means for signalling, based on the determined position of said object, when said object is less than a predetermined distance from said vehicle.

4. An obstacle detecting device as claimed in claim 1, wherein:
   said display image includes an image of a second object present in said environment; and
   said optical detecting means further detects distances from said vehicle to said second object, while detecting distances from said vehicle to said first object, when said image of said second object is in at least one of said regions.

5. An obstacle detecting device as claimed in claim 1, wherein said optical detecting means detects the distances from said vehicle to said object when said image of said object is in multiple said regions.

6. An obstacle detecting device as claimed in claim 1, wherein said regions are substantially rectangular.

7. An obstacle detecting device as claimed in claim 1, wherein said region designating means positions said regions substantially linearly with respect to each other across said display image plane.

8. An obstacle detecting device as claimed in claim 1, wherein said region designating means positions said regions substantially non-linearly with respect to each other across said display image plane.

* * * * *